United States Patent
Smith et al.

(10) Patent No.: US 9,353,885 B1
(45) Date of Patent: May 31, 2016

(54) FOOT-OPERATED, PORTABLE FAUCET

(71) Applicants: Terry Smith, Pickens, SC (US); Ruth Smith, Pickens, SC (US)

(72) Inventors: Terry Smith, Pickens, SC (US); Ruth Smith, Pickens, SC (US)

(*) Notice: Subject to any disclaimer, the term of this patent is extended or adjusted under 35 U.S.C. 154(b) by 0 days.

(21) Appl. No.: 14/600,332

(22) Filed: Jan. 20, 2015

(51) Int. Cl.
*F16K 31/62* (2006.01)
*E03C 1/05* (2006.01)
*F16K 1/20* (2006.01)
*A01K 7/06* (2006.01)

(52) U.S. Cl.
CPC . *F16K 31/62* (2013.01); *A01K 7/06* (2013.01); *E03C 1/052* (2013.01); *F16K 1/2007* (2013.01)

(58) Field of Classification Search
CPC ....... F16K 31/62; F16K 1/2007; E03C 1/052; A01K 7/06
USPC .................. 251/295; 119/76; 4/615, 619, 638
See application file for complete search history.

(56) References Cited

U.S. PATENT DOCUMENTS

| | | | |
|---|---|---|---|
| 2,899,137 A | 8/1959 | Martin | |
| 3,081,945 A | 3/1963 | Dickey | |
| 3,272,181 A * | 9/1966 | Ramsey | A01K 7/06 119/76 |
| 3,497,140 A | 2/1970 | Puegner | |
| 4,729,414 A * | 3/1988 | Beber | A01K 7/06 119/76 |
| 4,765,003 A * | 8/1988 | Chang | E03C 1/322 4/624 |
| 4,924,812 A * | 5/1990 | Bernays, Jr. | A01K 7/06 119/76 |
| 4,934,001 A * | 6/1990 | Landreth | A47K 3/285 4/615 |
| 5,199,119 A * | 4/1993 | Weber | E03C 1/052 251/295 |
| 5,263,684 A | 11/1993 | McGuire | |
| 5,502,848 A * | 4/1996 | Cowan | A47K 1/02 4/619 |
| 5,996,142 A * | 12/1999 | Colman | A47K 3/285 239/276 |
| 6,279,508 B1 * | 8/2001 | Marchant | A01K 7/06 119/76 |
| 6,345,397 B1 * | 2/2002 | Haubrich | E03C 1/04 4/615 |
| 6,772,793 B2 | 8/2004 | Warning | |
| 7,017,602 B2 | 3/2006 | Garver | |
| 7,114,202 B1 * | 10/2006 | Padrick | A47K 3/285 4/615 |
| 7,677,200 B2 * | 3/2010 | Lytle | A01K 7/06 119/76 |
| 8,307,851 B2 * | 11/2012 | Warsowe | F16K 31/62 251/295 |
| 2010/0326551 A1 | 12/2010 | Houghton | |
| 2011/0248098 A1 | 10/2011 | Kopke | |
| 2013/0087728 A1 * | 4/2013 | Ashby | F16K 31/62 251/213 |

* cited by examiner

Primary Examiner — John Bastianelli

(57) ABSTRACT

The foot-operated, portable faucet includes a faucet spout that extends vertically from a housing. The housing includes at least one mounting bracket thereon such that said housing is adapted to be secured to a ground surface. The housing includes a female garden hose connection that is in fluid communication with a water valve. The water valve is also in fluid communication with the faucet spout. The water valve is controlled via a foot pedal that is pivotably engaged with respect to a side surface of the housing. When in use, the foot pedal is depressed in order for the water valve to open fluid communication from the female garden hose connection to the water spout. An alternative embodiment may include an auxiliary male garden hose connection. Other embodiments may utilize a faucet spout of varying heights that extend upwardly from the housing.

8 Claims, 6 Drawing Sheets

FOOT-OPERATED, PORTABLE FAUCET

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of water faucets, more specifically, a portable water faucet that is operated via a foot pedal.

SUMMARY OF THE INVENTION

An embodiment of the disclosure meets the needs presented above by generally comprising a faucet spout that extends vertically from a housing. The housing includes at least one mounting bracket thereon such that said housing is adapted to be secured to a ground surface. The housing includes a female garden hose connection that is in fluid communication with a water valve. The water valve is also in fluid communication with the faucet spout. The water valve is controlled via a foot pedal that is pivotably engaged with respect to a side surface of the housing. When in use, the foot pedal is depressed in order for garden hose connection to the water spout. An alternative embodiment may include an auxiliary male garden hose connection. Other embodiments may utilize a faucet spout of varying heights that extend upwardly from the housing.

These together with additional objects, features and advantages of the foot-operated, portable faucet will be readily apparent to those of ordinary skill in the art upon reading the following detailed description of presently preferred, but nonetheless illustrative, embodiments of the foot-operated, portable faucet when taken in conjunction with the accompanying drawings.

In this respect, before explaining the current embodiments of the foot-operated, portable faucet in detail, it is to be understood that the foot-operated, portable faucet is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the foot-operated, portable faucet.

It is therefore important that the claims be regarded as including such equivalent construction insofar as they do not depart from the spirit and scope of the foot-operated, portable faucet. It is also to be understood that the phraseology and terminology employed herein are for purposes of description and should not be regarded as limiting.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 6:
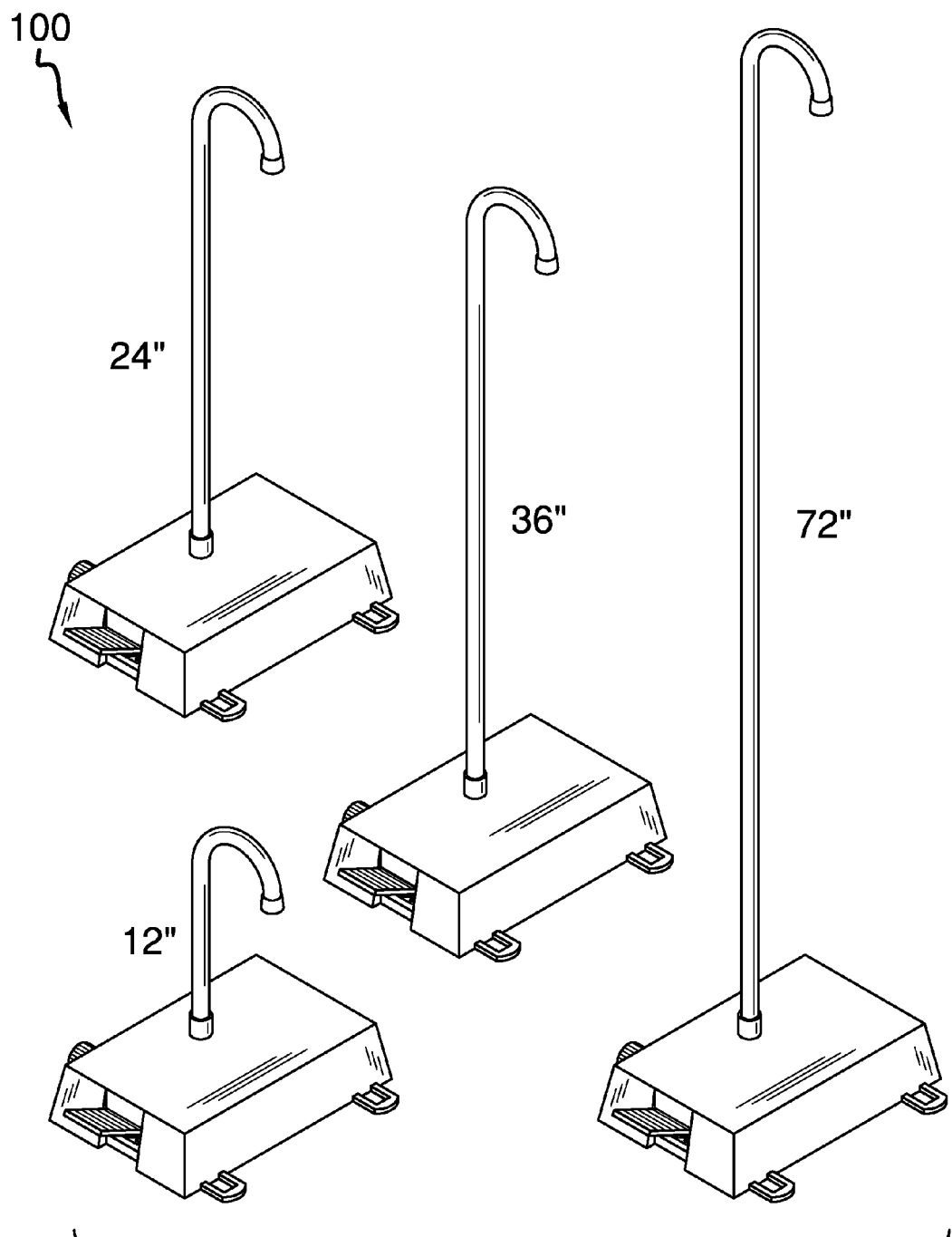
FIG. 6 is a perspective view of differing embodiments of the disclosure.

As best illustrated in FIGS. 1 through 6, the foot-operated, portable faucet 100 (hereinafter invention) includes a faucet spout 101 that extends vertically from a housing 102. The faucet spout 101 has a "U" bend 103 adjacent to a spout top distal end 104. The faucet spout 101 extends a spout distance 105 upwardly from a top housing surface 106 of the housing 102. Referring to FIG. 6, the faucet spout 101 may have a spout distance 105 that varies in order to provide differing applications of use. The housing 102 is of hollowed construction, and includes other componentry associated with the invention 100.

The housing 102 is further defined with a first side surface 107 that includes a female garden hose connection 108 thereon. The female garden hose connection 108 includes a first conduit 109 that extends into the housing 102. The first conduit 109 includes a first port 110 and a second port 111. The first port 110 is in fluid communication with a valve 112. The valve 112 is in turn connected to a spout bottom distal end 113. The valve 112 controls fluid connection between the first conduit 109 and the faucet spout 101.

The housing 102 is further defined with a second side surface 114 that includes a foot pedal 115 pivotably engaged thereon. The foot pedal 115 connects to a linkage member 116 located inside of the housing 102. The linkage member 116 is in turn connected to the valve 112. The foot pedal 115 is able to control the valve 112 in order to disrupt or allow fluid connection between the faucet spout 101 and the female garden hose connection 108. The foot pedal 115 pivots with respect to a spring-loaded hinge 117 located on the second side surface 114 of the housing 102.

The second port 111 of the first conduit 109 may connect to a second conduit 118 that in turn extends through a third side surface 119 of the housing 102. Moreover, the second conduit 118 may connect to a male garden hose connection 120 such that the invention 100 may be adapted to supply water to a second garden hose 201. As a side note, the female garden hose connection 108 is adapted to be connected with a first garden hose 200 in order to supply water to the invention 100.

Figure 1:
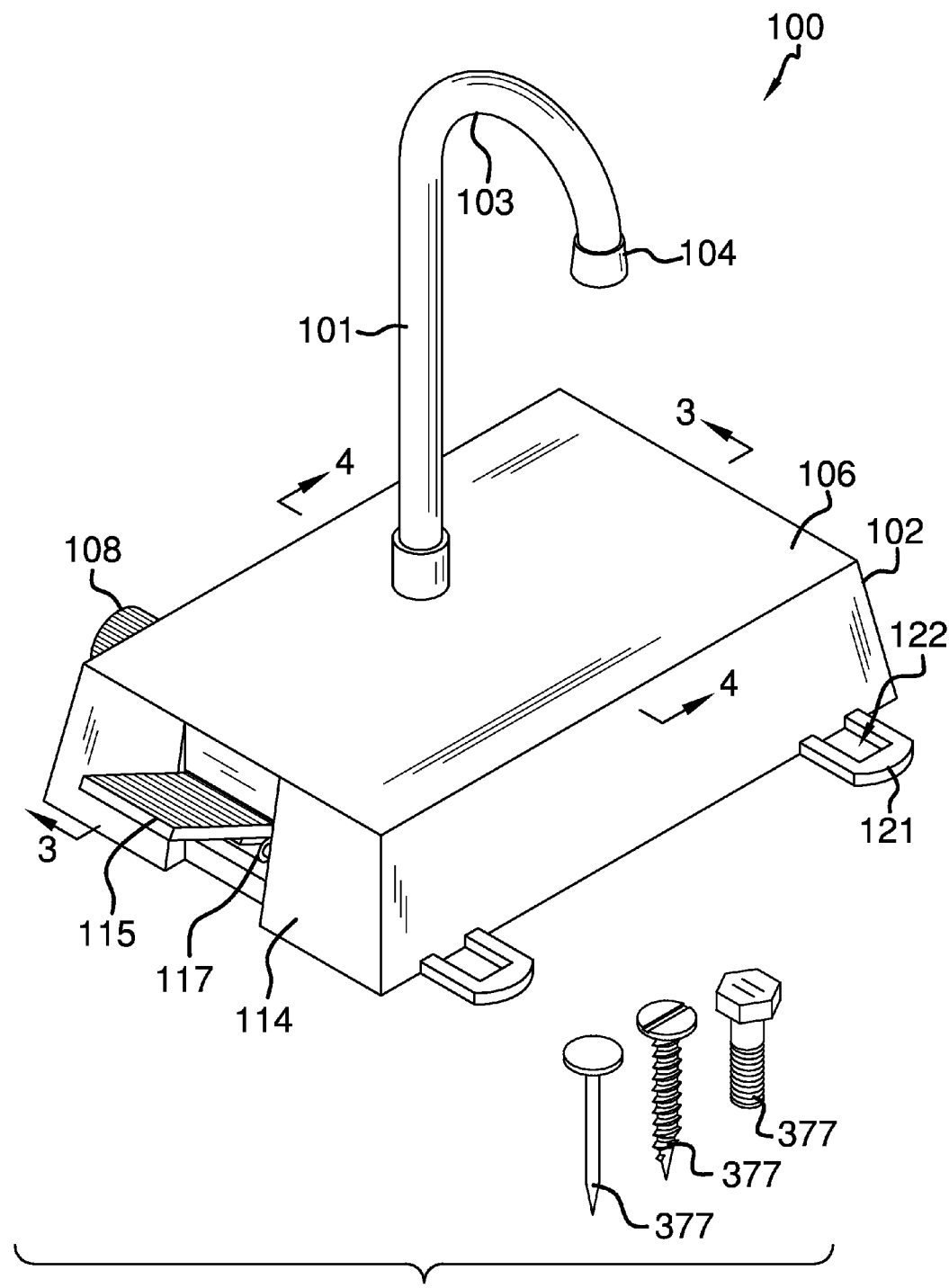
FIG. 1 is a perspective view of an embodiment of the disclosure.
Figure 2:
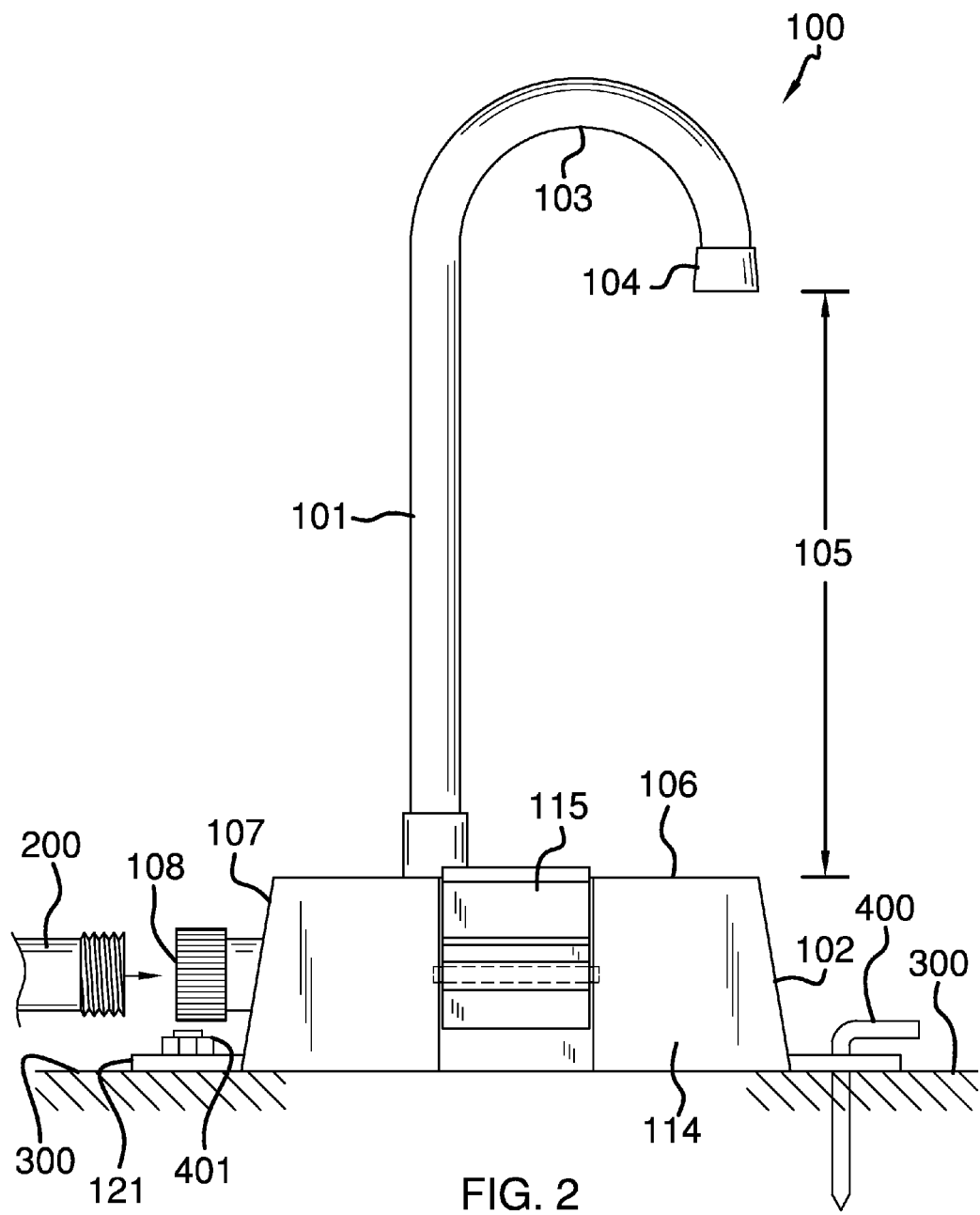
FIG. 2 is a side view of an embodiment of the disclosure.
Figure 3:
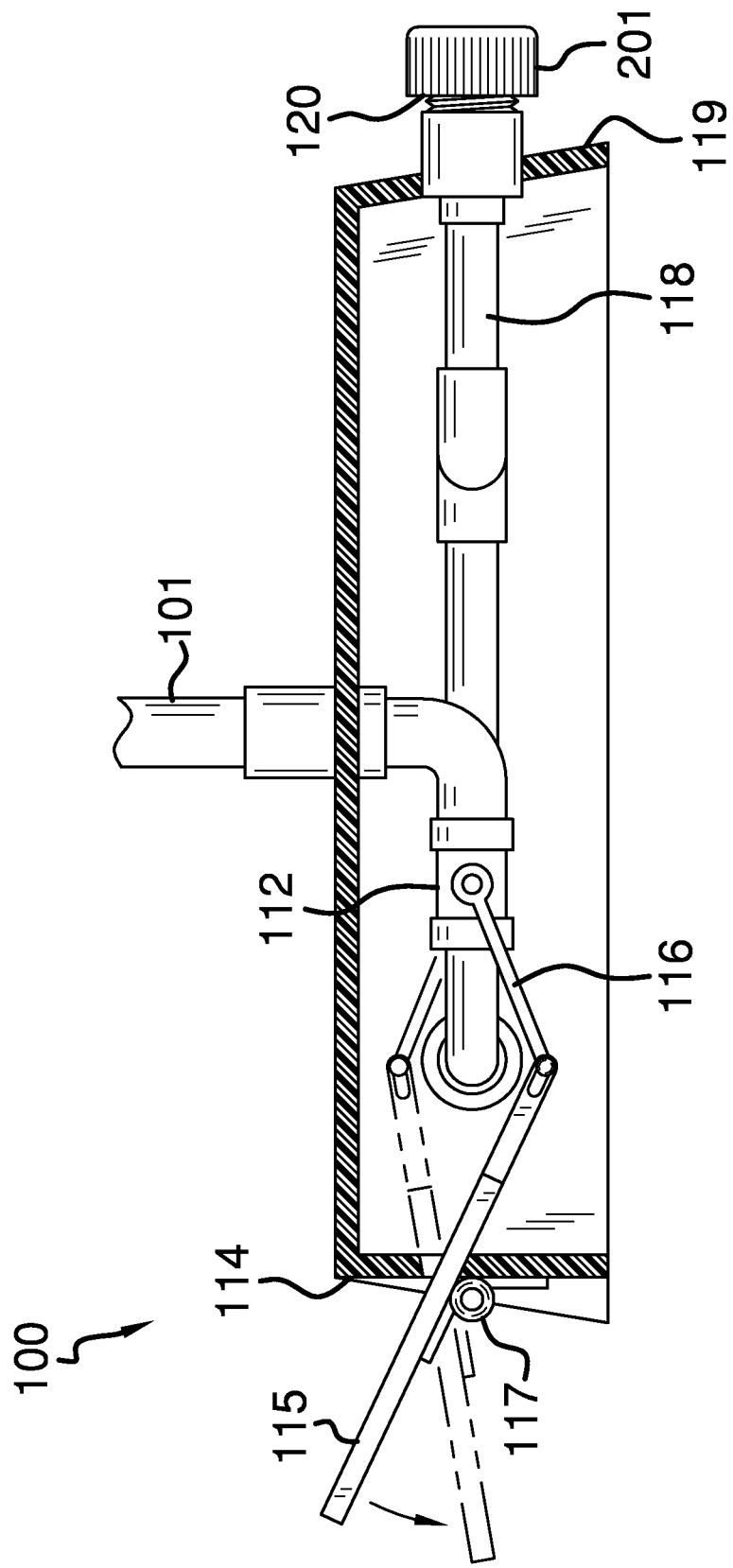
FIG. 3 is a cross-sectional view along line 3-3 in FIG. 1.

The housing 102 includes at least one mounting bracket 121 that extends outwardly from the housing 102. The at least one mounting bracket 121 is adapted to be used to secure the housing 102 to a ground surface 300. Moreover, the at least one mounting bracket 121 may be further defined with a bracket hole 122 into which a ground pin 400 may be driven into the ground surface 300 in order to secure the housing 102 to the ground surface 300. It shall be noted that other means may be employed to secure the housing 102 to an object or the ground surface 300. Referring to FIG. 1, other securing members 377 comprise bolts, screws, and nails that may be used in conjunction with or in lieu of the ground pin 400.

Figure 4:
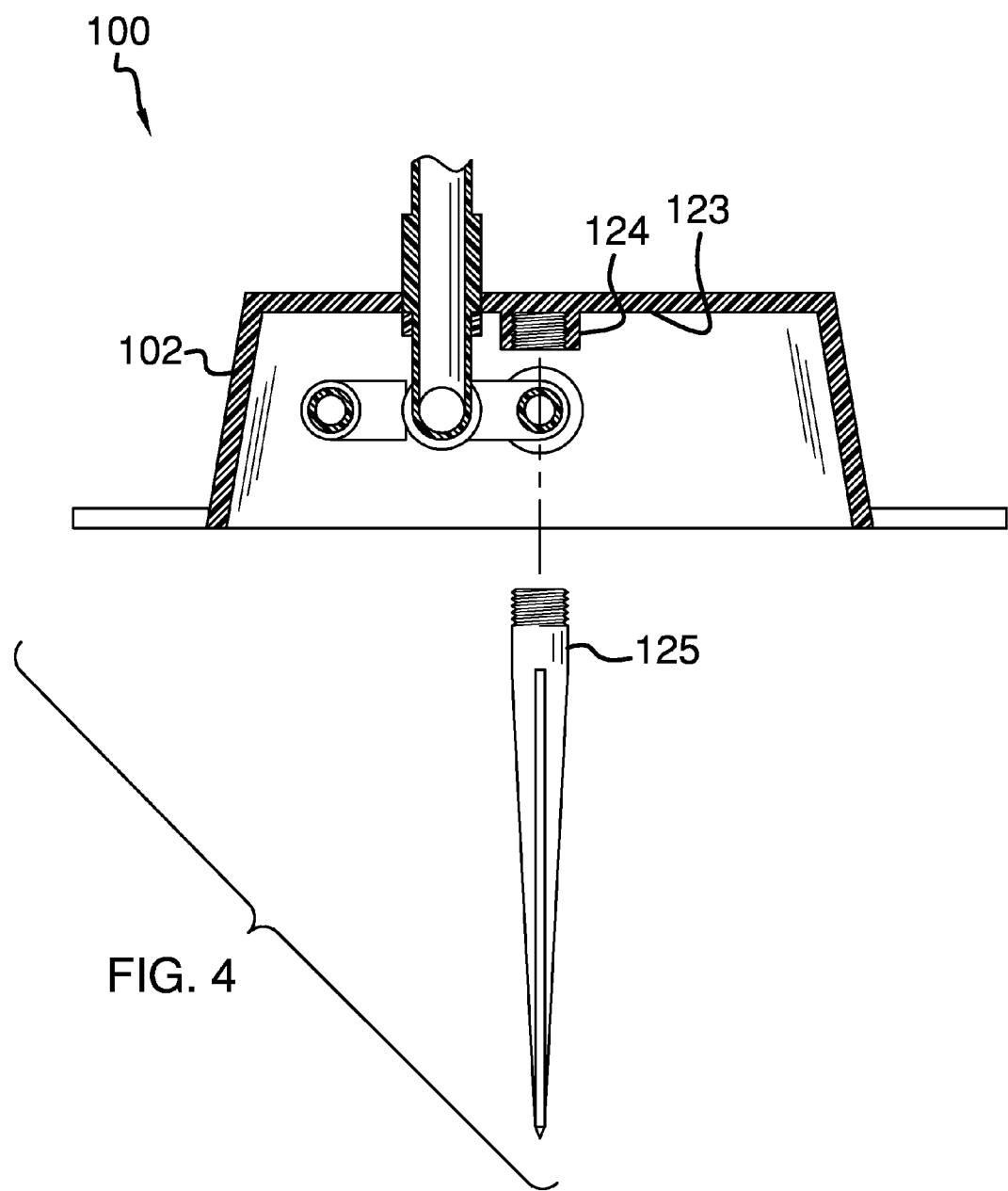
FIG. 4 is a cross-sectional view along line 4-4 in FIG. 1.
Figure 5:
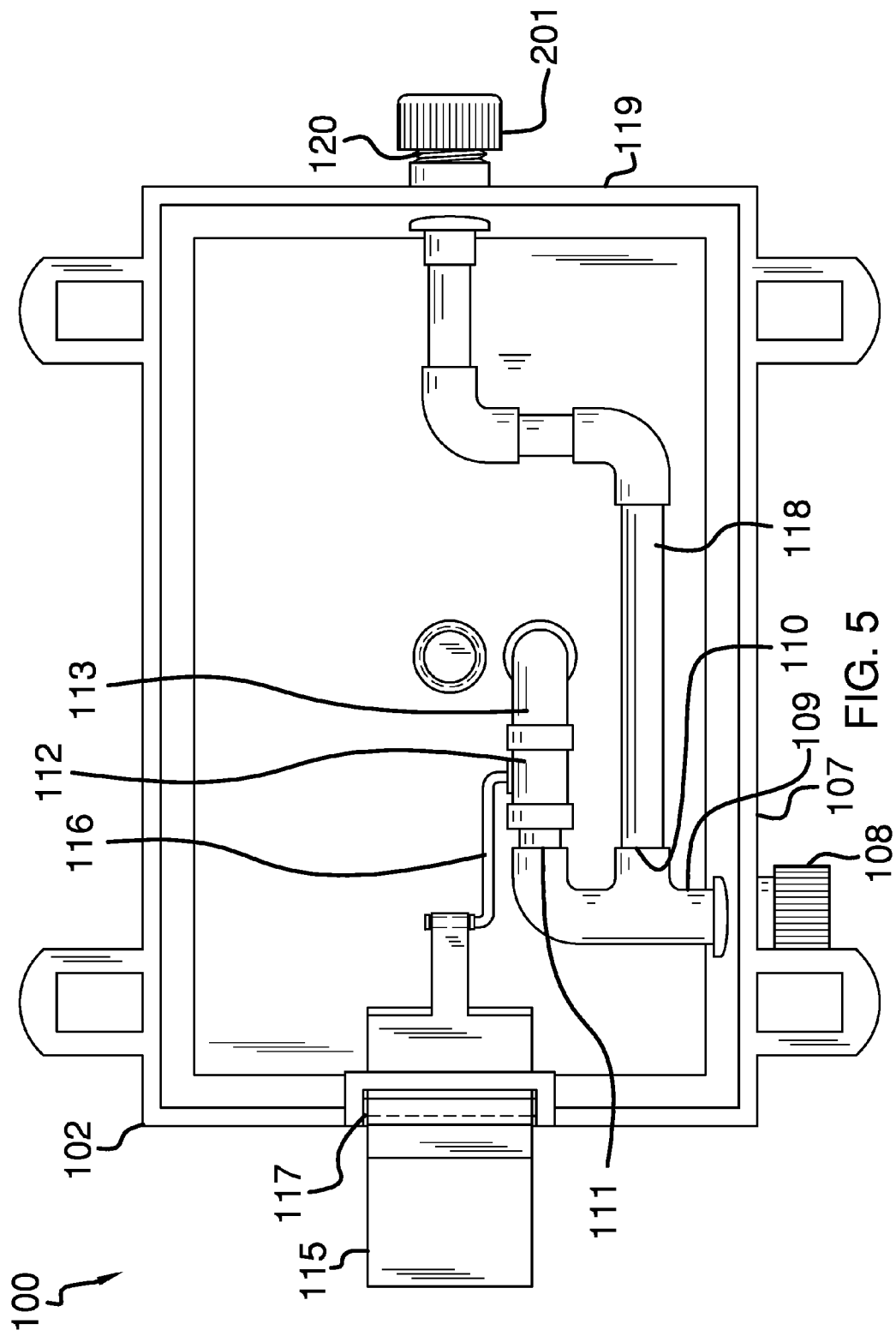
FIG. 5 is a bottom view of an embodiment of the disclosure.

Referring to FIG. 4, the housing 102 is further defined with a bottom housing surface 123 that includes a threaded protuberance 124 thereon. The threaded protuberance 124 enables a second ground pin 125 to be secured thereto. Moreover, the second ground pin 125 is directed downwardly, and is adapted to be driven into the ground surface 300 in order to secure the housing 102 to the ground surface 300.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A foot-operated, portable faucet comprising:
a faucet spout that extends upwardly from a housing that is adapted to be secured to a ground surface;
said housing includes a female garden hose connection that is adapted to be connected to a first garden hose;
wherein said female garden hose connection is connected to a valve that is also connected to the faucet spout;
wherein said valve is controlled via a foot pedal that is pivotably engaged with respect to the housing such that upon depression of said foot pedal, water is able to be dispensed via the faucet spout;
wherein the female garden hose connection includes a first conduit that extends into the housing; wherein the first conduit includes a first port and a second port;
wherein the second port of the first conduit connects to a second conduit that in turn extends through a third side surface of the housing;
wherein the faucet spout has a "U" bend adjacent to a spout top distal end;
wherein the faucet spout extends a spout distance upwardly from a top housing surface of the housing;
wherein the housing is further defined with a first side surface that includes the female garden hose connection thereon;
wherein the first port is in fluid communication with the valve;
wherein the valve is in turn connected to a spout bottom distal end of the faucet spout;
wherein the valve controls fluid connection between the first conduit and the faucet spout;
wherein the housing is further defined with a second side surface that includes the foot pedal pivotably engaged thereon;
wherein the foot pedal connects to a linkage member located inside of the housing;
wherein the linkage member is in turn connected to the valve;
wherein the foot pedal controls the valve in order to disrupt or allow fluid connection between the faucet spout and the female garden hose connection; and
wherein the foot pedal pivots with respect to a spring-loaded hinge located on the second side surface of the housing.

2. The foot-operated, portable faucet according to claim 1 wherein the second conduit connects to a male garden hose connection such that a second garden hose is able to be dispensed water.

3. The foot-operated, portable faucet according to claim 2 wherein the housing includes at least one mounting bracket that extends outwardly from the housing; wherein the at least one mounting bracket is adapted to be used to secure the housing to said ground surface.

4. The foot-operated, portable faucet according to claim 3 wherein the at least one mounting bracket is further defined with a bracket hole into which a ground pin or securing member is driven into the ground surface in order to secure the housing to the ground surface.

5. The foot-operated, portable faucet according to claim 4 wherein the housing is further defined with a bottom housing surface that includes a threaded protuberance thereon; wherein the threaded protuberance enables a second ground pin to be secured thereto; wherein the second ground pin is directed downwardly, and is adapted to be driven into the ground surface in order to secure the housing to the ground surface.

6. A foot-operated, portable faucet comprising:
a faucet spout that extends upwardly from a housing that is adapted to be secured to a ground surface;
said housing includes a female garden hose connection that is adapted to be connected to a first garden hose;
wherein said female garden hose connection is connected to a valve that is also connected to the faucet spout;
wherein said valve is controlled via a foot pedal that is pivotably engaged with respect to the housing such that upon depression of said foot pedal, water is able to be dispensed via the faucet spout;
wherein the faucet spout has a "U" bend adjacent to a spout top distal end; wherein the faucet spout extends a spout distance upwardly from a top housing surface of the housing;
wherein the housing is further defined with a first side surface that includes the female garden hose connection thereon;
wherein the female garden hose connection includes a first conduit that extends into the housing; wherein the first conduit includes a first port and a second port; wherein the first port is in fluid communication with the valve; wherein the valve is in turn connected to a spout bottom distal end of the faucet spout; wherein the valve controls fluid connection between the first conduit and the faucet spout;
wherein the housing is further defined with a second side surface that includes the foot pedal pivotably engaged thereon; wherein the foot pedal connects to a linkage member located inside of the housing; wherein the linkage member is in turn connected to the valve; wherein the foot pedal controls the valve in order to disrupt or allow fluid connection between the faucet spout and the female garden hose connection; wherein the foot pedal pivots with respect to a spring-loaded hinge located on the second side surface of the housing; wherein the second port of the first conduit connects to a second conduit that in turn extends through a third side surface of the housing; wherein the second conduit connects to a male garden hose connection such that a second garden hose is able to be dispensed water.

7. The foot-operated, portable faucet according to claim 6 wherein the housing includes at least one mounting bracket that extends outwardly from the housing; wherein the at least one mounting bracket is adapted to be used to secure the housing to said ground surface; wherein the at least one mounting bracket is further defined with a bracket hole into which a ground pin is driven into the ground surface in order to secure the housing to the ground surface.

8. The foot-operated, portable faucet according to claim 7 wherein the housing is further defined with a bottom housing surface that includes a threaded protuberance thereon; wherein the threaded protuberance enables a second ground pin to be secured thereto; wherein the second ground pin is directed downwardly, and is adapted to be driven into the ground surface in order to secure the housing to the ground surface.

* * * * *